(12) United States Patent
Penot et al.

(10) Patent No.: US 8,095,333 B2
(45) Date of Patent: Jan. 10, 2012

(54) DEVICE FOR LOCATING A RIGHT OR LEFT POSITION OF A TIRE AND WHEEL ASSEMBLY OF A VEHICLE

(75) Inventors: Thierry Penot, Clermont-Ferrand (FR); Xavier Huchard, Pont-du-Chateau (FR); Christophe Villien, Grenoble (FR); Sébastien Dauve, Biviers (FR); François Alcouffe, Grenoble (FR)

(73) Assignees: Michelin Recherche et Technique, S.A., Granges-Paccot (CH); TRW Automotive U.S., LLC, Livonia, MI (US)

( * ) Notice: Subject to any disclaimer, the term of this patent is extended or adjusted under 35 U.S.C. 154(b) by 145 days.

(21) Appl. No.: 12/271,540

(22) Filed: Nov. 14, 2008

(65) Prior Publication Data

US 2009/0144017 A1   Jun. 4, 2009

(30) Foreign Application Priority Data

Nov. 30, 2007   (FR) .................................... 07 59448

(51) Int. Cl.
*G01P 3/00* (2006.01)
*G01C 9/00* (2006.01)
*G01C 19/00* (2006.01)
(52) U.S. Cl. .................. 702/145; 702/150; 702/151
(58) Field of Classification Search .............. 702/150, 702/145, 151; 324/165
See application file for complete search history.

(56) References Cited

U.S. PATENT DOCUMENTS

| | | | | |
|---|---|---|---|---|
| 4,593,564 A * | 6/1986 | Brihier | ............................ | 73/473 |
| 5,341,097 A * | 8/1994 | Wu | ............................ | 324/207.2 |
| 5,523,679 A * | 6/1996 | Kalb | ............................ | 324/165 |
| 5,708,216 A * | 1/1998 | Garshelis | ................ | 73/862.335 |
| 6,229,299 B1 * | 5/2001 | Strashny | ........................ | 324/174 |
| 7,055,917 B2 | 6/2006 | Huchard et al. | ............. | 303/188 |
| 7,395,701 B2 | 7/2008 | Huchard | ......................... | 73/146 |
| 7,707,876 B2 * | 5/2010 | Miyoshi | ........................ | 73/146 |
| 2002/0047715 A1 * | 4/2002 | Holm | ............................ | 324/683 |
| 2005/0258820 A1 * | 11/2005 | Forster | ........................ | 324/165 |
| 2006/0132356 A1 | 6/2006 | Dulac | ........................... | 342/173 |
| 2006/0142911 A1 * | 6/2006 | Allard et al. | .................... | 701/29 |
| 2006/0152212 A1 | 7/2006 | Beranger et al. | .............. | 324/165 |

(Continued)

FOREIGN PATENT DOCUMENTS

EP            0 760 299 A1       3/1997

(Continued)

*Primary Examiner* — Michael Nghiem
(74) *Attorney, Agent, or Firm* — Fitzpatrick, Cella, Harper & Scinto

(57) ABSTRACT

A location device is provided, in which the device is configured to be carried by a tire and wheel assembly so as to locate a right or left position of the assembly in a vehicle. The device includes two magnetic sensors with axes of maximum sensitivity; a measurement circuit for measuring a signal across terminals of each of the magnetic sensors, the measurement circuit being able to deliver two periodic signals phase-shifted with respect to one another and each periodic signal being representative of variations in values of a magnetic field detected by a corresponding magnetic sensor during a revolution of the tire and wheel assembly; and a calculation processor programmed to determine, based on the phase shift between the two periodic signals, a direction of rotation of the tire and wheel assembly, and to deduce from the direction of rotation and a direction of travel of the vehicle, a right or left location of the tire and wheel assembly. The two magnetic sensors have their axes of maximum sensitivity oriented in parallel, and in the two magnetic sensors are configured to be placed on the tire and wheel assembly at distinct azimuths.

18 Claims, 3 Drawing Sheets

U.S. PATENT DOCUMENTS

2006/0272402 A1* 12/2006 Yin et al. .................. 73/146.8
2009/0205414 A1* 8/2009 Vassilieff et al. ............ 73/146

FOREIGN PATENT DOCUMENTS

| | | | |
|---|---|---|---|
| EP | 1 106 397 | A2 | 6/2001 |
| EP | 1 669 221 | A1 | 6/2006 |
| EP | 1 669 222 | A1 | 6/2006 |
| EP | 1 800 913 | A1 | 6/2007 |
| FR | 2 856 145 | A1 | 12/2004 |
| GB | 2 071 331 | * | 9/1981 |

* cited by examiner

DEVICE FOR LOCATING A RIGHT OR LEFT POSITION OF A TIRE AND WHEEL ASSEMBLY OF A VEHICLE

CROSS REFERENCE TO RELATED APPLICATION

The present application claims the benefit of foreign priority based on French Application No. 0759448 filed in France on Nov. 30, 2007.

FIELD OF THE INVENTION

The present invention relates to a device for locating a right or left position of a tire and wheel assembly on a vehicle, as well as to tire and wheel assemblies equipped with such devices.

TECHNOLOGICAL BACKGROUND

For safety purposes, an increasing number of motor vehicles have been made to possess monitoring systems with sensors mounted on each of the tire and wheel assemblies of the vehicle. The monitoring systems are dedicated to measuring one or more parameters, such as pressure and/or temperature of the tires, and are intended to inform the vehicle's driver of any abnormal variation in the measured parameter(s).

These monitoring systems customarily include a sensor placed in each tire and wheel assembly with a microprocessor and a radiofrequency or RF emitter, as well as a central unit for receiving signals emitted by the RF emitters, the central unit including a computer integrating a radiofrequency receiver connected to an antenna.

One of the problems presented by such conventional monitoring systems resides in the need to associate, with each signal received by the receiver of the central unit, information relating to the location of the sensor and therefore of the tire and wheel assembly from which this signal originates. This need persists for the lifetime of the vehicle, that is, this need remains even after changes of tire and wheel assemblies and even after simple changes in the positioning of these assemblies on the vehicle.

European patent document EP 1 669 221 A1 presents a device configured to be carried by a tire and wheel assembly so as to locate a right or left position of the assembly in a vehicle. The device includes:
two magnetic sensors with axes of maximum sensitivity;
a measurement circuit for measuring a signal from each of the magnetic sensors, and for delivering two periodic signals phase-shifted with respect to each other, with each periodic signal being representative of variations in magnetic field values detected by the magnetic sensors during a revolution of the tire and wheel assembly; and
a calculation processor programmed to determine, on the basis of the phase shift between the two periodic signals, a direction of rotation of the tire and wheel assembly, and to deduce, from this direction of rotation and a direction of travel of the vehicle, the right or left location of the tire and wheel assembly.

This device is such that the axes of maximum sensitivity of the two magnetic sensors are configured to be placed in the tire and wheel assembly in a secant plane with respect to a rotation axis of the tire and wheel assembly, and offset with respect to one other, in this secant plane, by a predetermined angle.

The two sensors of this device detect a global magnetic field that surrounds them, composed of a terrestrial magnetic field plus a vehicle environmental magnetic field. This vehicle environmental magnetic field is the resultant of a set of vehicle fields created by the presence of electrical or magnetic equipment on board the vehicle as well as by metallic parts close to the vehicle's wheel arches, such as brake calipers and suspension elements, for example.

However, there exist points on the terrestrial globe and directions of travel of the vehicle for which the contribution of the terrestrial magnetic field measured by the two sensors of the above device becomes negligible in relation to the contribution of the environmental magnetic field, and this may pose problems in utilizing the signals from the two sensors.

SUMMARY OF THE INVENTION

An aspect of the present invention is directed to an improvement to the device described in European patent document EP 1 669 221 A1, in which the improved device includes two magnetic sensors having their two axes of maximum sensitivity oriented in parallel, such that the two magnetic sensors are configured to be placed in the tire and wheel assembly at distinct azimuths.

As previously, the signals measured across the sensors' terminals exhibit a phase shift between them, but the contribution to this phase shift from the terrestrial magnetic field is zero, such that this phase shift is related solely to the contribution of the environmental field of the vehicle as well as to an amplitude of a circumferential offset in azimuths between the two sensors.

Advantageously, the two magnetic sensors are configured to be placed on the tire and wheel assembly at substantially the same distance from a rotation axis of the assembly. This configuration allows the two magnetic sensor, i.e., the two coils thereof, to be sensitive to flux variations of the same environmental field.

The two axes of maximum sensitivity of the two magnetic sensors can coincide and advantageously these sensors can be configured to be placed in the tire and wheel assembly with their axes of maximum sensitivity oriented circumferentially.

According to a preferred embodiment, the two magnetic sensors are configured to be placed in the tire and wheel assembly in such a way that the two axes of maximum sensitivity are oriented parallel to the rotation axis of the tire and wheel assembly.

When the two axes of maximum sensitivity of the two magnetic sensors are oriented parallel to the rotation axis, it is implied that whatever the orientation of the terrestrial magnetic field, this field has no influence on the amplitude of the signals measured across the terminals of the two magnetic sensors. The amplitude of the signals is then related solely to the environmental field surrounding the device.

Preferably, the circumferential distance between the centers of the two magnetic sensors lies between 1 and 8 cm. A distance of less than 1 cm makes it no longer possible to determine with sufficient precision the phase shift between the two signals with the customary acquisition frequencies, and a distance of greater than 8 cm makes it difficult to integrate the two magnetic sensors into a single housing.

The determination of the phase shift between the two signals at the outputs of the magnetic sensors can be performed after amplification and shaping of the signals. Preferably, a calculation unit or processor is programmed to determine the phase shift, and more simply the sign of this phase shift, between the two periodic signals by intercorrelating the two signals.

Another aspect of the present invention is directed to a tire and wheel assembly equipped with the above-described device. The device can, for example, be adapted to be fixed to an inflation valve or fixed to a surface of a rim of a wheel of the tire and wheel assembly, and it is also possible to fix the device onto an inside surface of the tire or to integrate the device into the tire's structure.

BRIEF DESCRIPTION OF THE DRAWINGS

The present invention will be better understood by virtue of the description of embodiments thereof considered in conjunction with the attached drawings, of which.

These figures are provided for purely illustrative purposes and have no limiting character on the invention as set forth in the claims.

DETAILED DESCRIPTION OF EMBODIMENTS OF THE INVENTION

Figure 1:
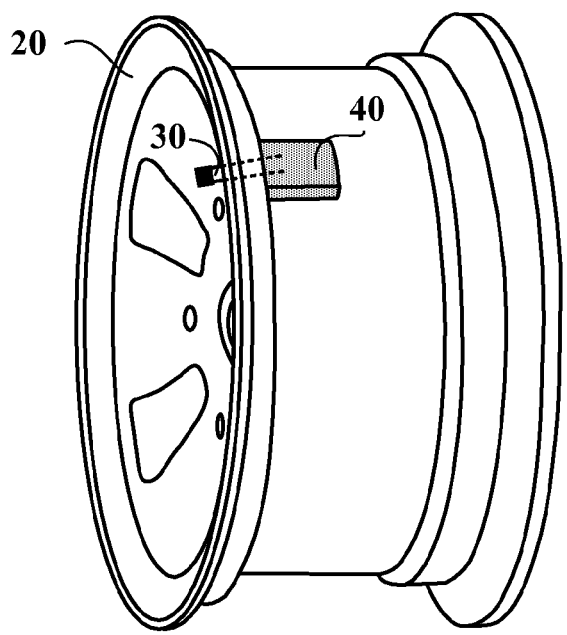
FIG. 1 schematically represents a perspective view of a conventional wheel equipped with a system of sensors secured to an inflation valve.

FIG. 1 represents a perspective view of a conventional wheel 20 equipped with an inflation valve 30 and a housing 40 designed to receive sensors. For the sake of clarity, a tire is not represented in FIG. 1.

Figure 2:
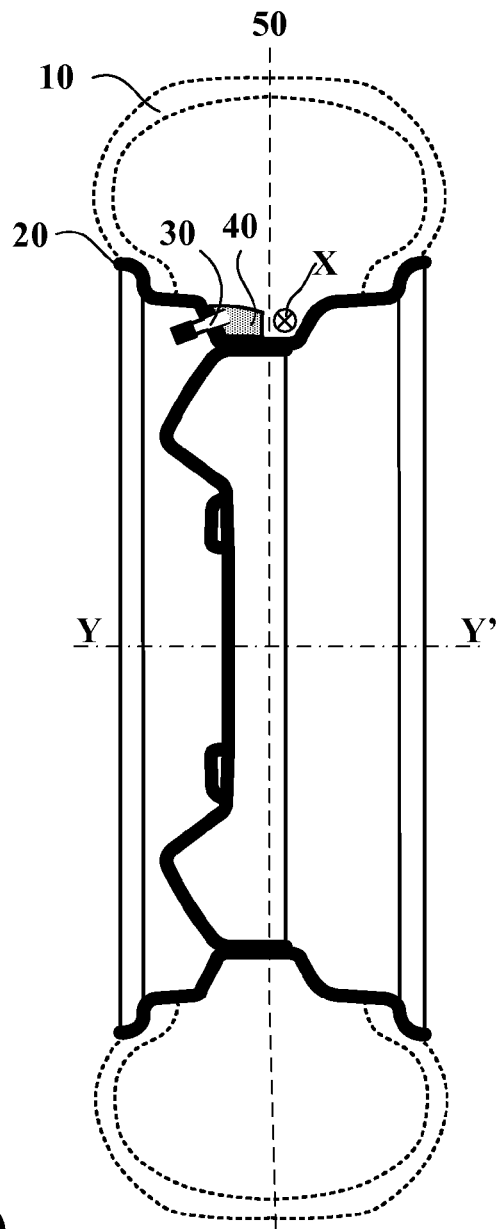
FIG. 2 schematically represents a cross-sectional view of a conventional tire and wheel assembly equipped with a system of sensors secured to an inflation valve.

FIG. 2 represents a cross-sectional view of a conventional tire and wheel assembly formed by a tire 10 and a wheel 20 and equipped with an inflation valve 30 and a housing 40 designed to receive sensors. A trace of a mid-plane 50 of the tire 10, a trace of a circumferential or tangential direction X at the level of the housing 40, and a trace of a rotation axis YY' of the tire-wheel assembly are also represented.

Figure 3:
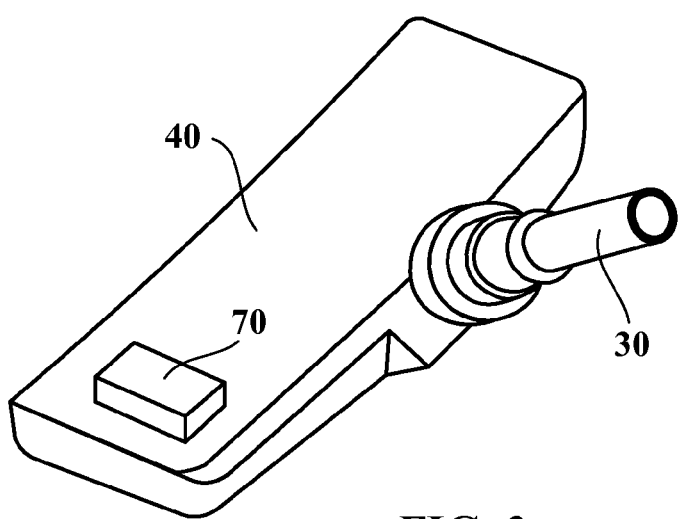
FIG. 3 schematically represents a perspective view of a conventional inflation valve and of a conventional housing secured to the valve and configured to receive sensors.

FIG. 3 schematically represents a perspective view of an inflation valve 30 and a housing 40 secured to the valve 30 and configured to accommodate sensors. Such a housing 40 is known, for example, from European patent document EP 1 106 397, and can be adapted to receive a device 70 according to an embodiment of the present invention.

Figure 4:
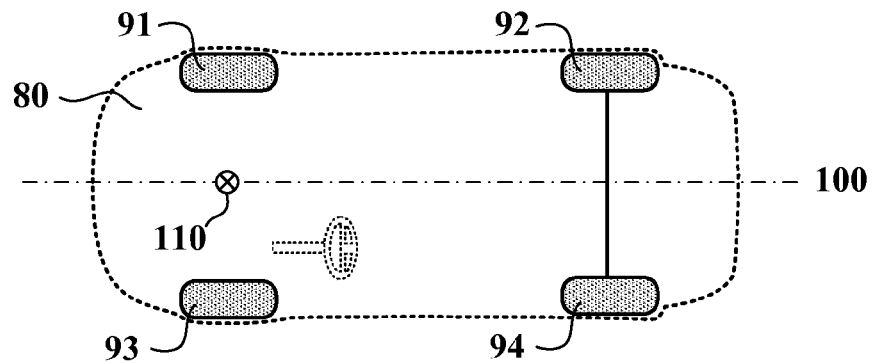
FIG. 4 schematically represents a plan view, from above, of a vehicle equipped with devices according to an embodiment of the invention.

FIG. 4 schematically represents a plan view, from above, of a vehicle 80 whose tire and wheel assemblies 91 to 94 are equipped with devices according to an embodiment of the present invention. Each device includes two magnetic sensors sensitive to an environmental magnetic field of the vehicle 80, the two magnetic sensors being disposed in such a way that their axes are parallel, or, the axes may even coincide.

The transfer of a tire and wheel assembly from the left side to the right side of the vehicle, while keeping the assembly on the outside with respect to the vehicle, is analyzed as a rotation, possibly followed by a translation. Thus, if the assembly 91 or the assembly 92 is replaced with the assembly 93, the latter is rotated by 180° about an axis 110 perpendicular to the ground (to attain the position of the assembly 91) and then shifted in translation (if the position of the assembly 92 is targeted). The consequence of the particular arrangement of the magnetic sensors is to reduce a rotational symmetry of the device, so that the relative configuration of the magnetic sensors is different on one side of the vehicle relative to the other. Thus, even the rotation of a tire and wheel assembly 91, 92, 93, or 94 about its rotation axis while rolling does not make it possible to obtain the same relative configuration of the magnetic sensors on the two sides of the vehicle 80. This relative configuration is therefore characteristic of each side of the vehicle 80.

Figure 5:
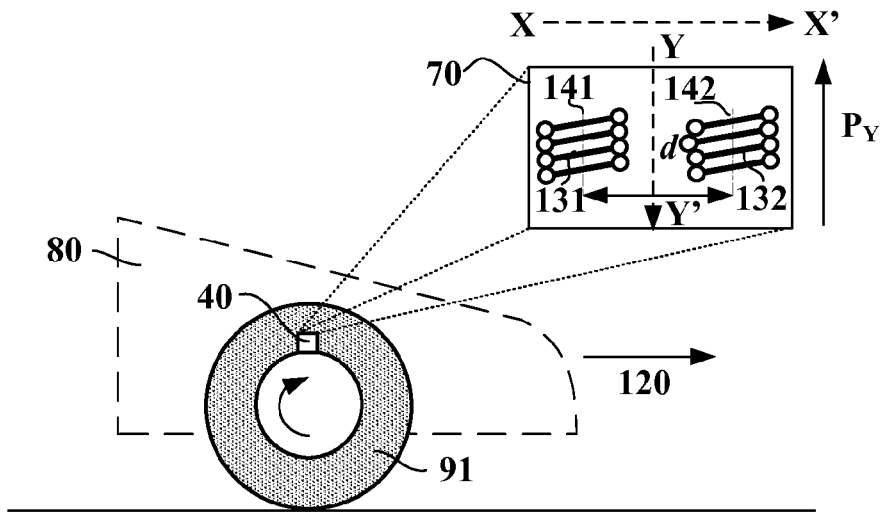
FIG. 5 schematically represents a side view of a tire and wheel assembly equipped with a device according to an embodiment of the invention, mounted on the right side of a vehicle.
Figure 6:
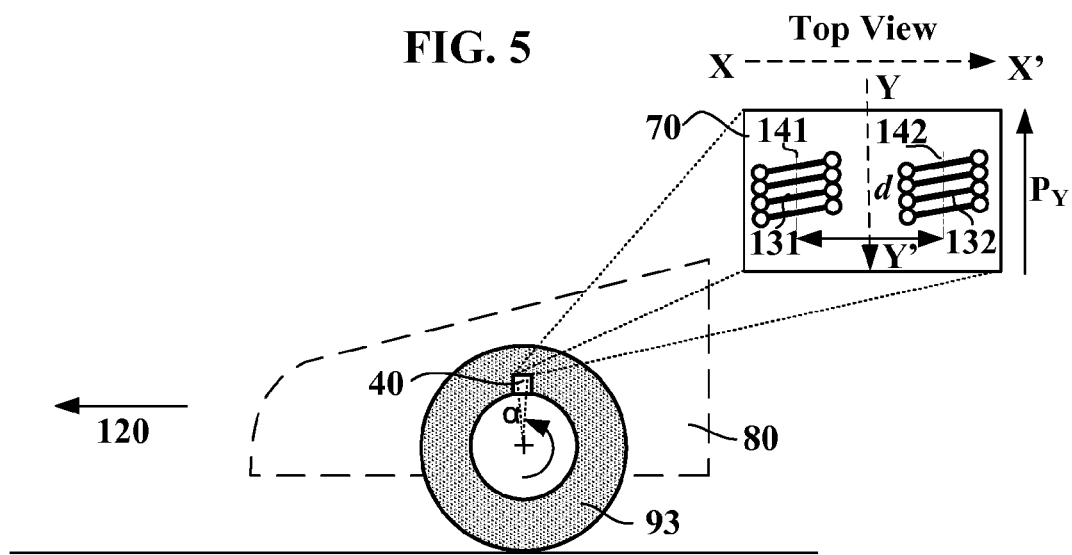
FIG. 6 schematically represents a side view of a tire and wheel assembly equipped with a device according to an embodiment of the invention, mounted on the left side of a vehicle.

This fundamental finding is illustrated in FIGS. 5 and 6, which represent side views of tire and wheel assemblies equipped with a device 70 according to an embodiment of the invention, mounted on the right (FIG. 5) and left (FIG. 6) side of the vehicle 80.

FIG. 5 shows the tire and wheel assembly 91 mounted on a front position of the right side of the vehicle 80, which is moving forward in a direction indicated by an arrow 120. The device 70, according to an embodiment of the invention, is mounted in the housing 40 and fixed to the assembly 91. The device 70 includes two magnetic sensors 131 and 132 sensitive to an environmental magnetic field P of the vehicle 80. Each magnetic sensor 131 and 132 includes a coil with a soft iron core. The two coils of the magnetic sensors 131 and 132 are disposed with their two axes, respectively 141 and 142, oriented parallel to a rotation axis YY' of the tire and wheel assembly 91. The two coils are thus sensitive practically solely to a component along YY' or an axial component of the vehicle's environmental magnetic field $P_y$. The two axes 141 and 142 are also offset circumferentially, that is, in a direction XX', by a distance d. A corresponding azimuthal offset α is illustrated in FIG. 6. For the sake of simplicity, the terms magnetic sensor and coil may be used interchangeably herein, that is, reference numeral 131 may be used to represent a magnetic sensor or a coil.

FIG. 6 shows the tire and wheel assembly 93 mounted on a front position of the left side of the vehicle 80, which is moving forward in a direction indicated by the arrow 120. The same device 70 according to the embodiment of the invention shown in FIG. 5 is mounted in the housing 40 and fixed in the same manner on the assembly 93 as in FIG. 5.

Comparison of FIG. 5 and FIG. 6 makes it possible to understand an autolocating operation of the device 70. When the tire and wheel assembly 91 provided with the device 70 is mounted on the right side of the vehicle 80 (case of FIG. 5) and when the vehicle 80 moves forward, the coil 132 always leads in phase relative to the coil 131; the tire-wheel assembly 91 must perform a rotation of a certain angle about its rotation axis in order for the coil 131 to be situated in the same position with respect to the vehicle's environmental magnetic field as the coil 132 initially was situated. The situation is reversed for the tire and wheel assembly 93 provided with the device 70 mounted on the left side of the vehicle 80 (case of FIG. 6); here, it is the coil 131 that leads in phase relative to the coil 132. It therefore suffices to determine a relative phase shift of signals measured by the two coils 131 and 132 to ascertain, for a given direction of motion (forward or backward) of the vehicle 80, the side of the vehicle 80 on which the coils are situated and thus the corresponding tire and wheel assemblies.

Figure 7:
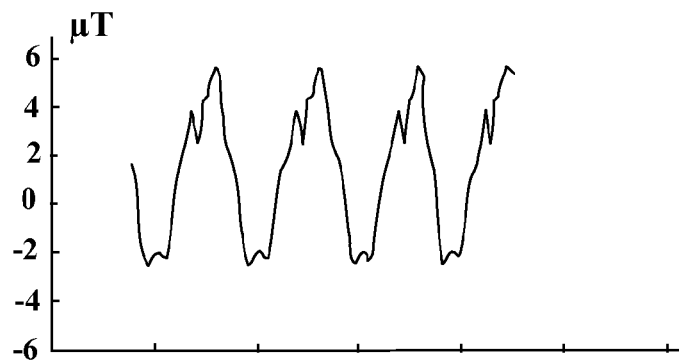
FIG. 7 represents an axial component of a remanent point magnetic field measured on a vehicle's rear axle.

FIG. 7 represents a component oriented along the rotation axis YY' of the vehicle's environmental magnetic field measured with a magnetometer fixed to the rim of a wheel. The curve shown in FIG. 7 was obtained based on a rear axle of a BMW 323i vehicle.

The magnetometer is fixed to the rim of the wheel in a position very close to that of a device fixed to the inflation valve of this wheel. It can be seen that the vehicle's environmental field for the rear axle of this particular vehicle and assessed at the level of a housing fixed to the inflation valve has a peak-to-peak amplitude of the order of 9 µT.

Each coil is a passive magnetic sensor that produces a signal proportional to a variation in magnetic flux passing through it, according to the Faraday-Lenz law. The larger and faster the variations in magnetic flux passing through the coil, the more ample is the signal generated by each coil. The amplitude therefore also depends on the rotation speed of the coil. In a particular embodiment, the value of the signal is integrated to retrieve the value of the field and circumvent the speed effect.

Figure 8:
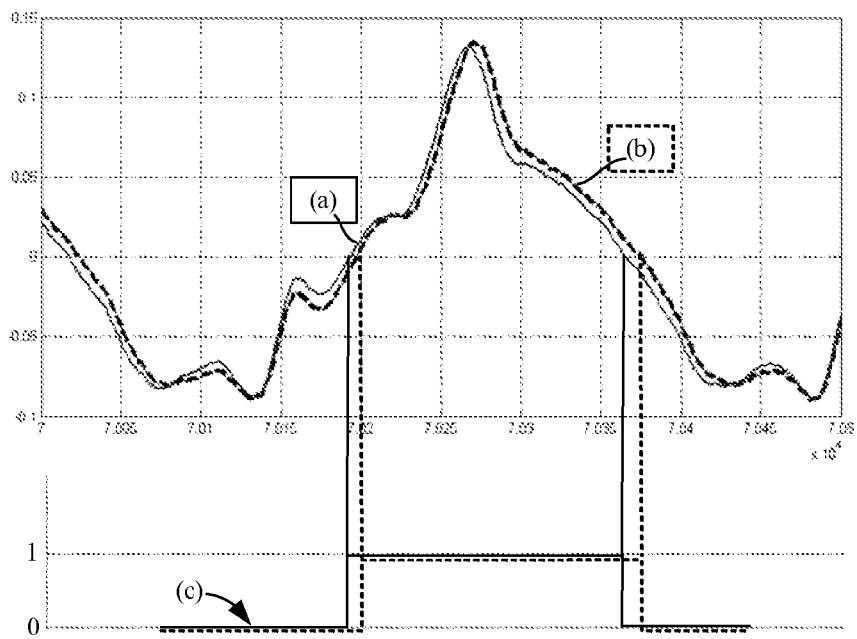
FIG. 8 represents signals obtained on a vehicle whose tires are equipped with a device according to an embodiment of the invention, before and after digital processing.

FIG. 8 represents signals measured across respective terminals of the two coils 131 and 132 as a function of an angle of rotation of the tire and wheel assembly (in degrees). Each coil produces a periodic signal whose periodicity is that of the rotation of its corresponding tire and wheel assembly; the frequency therefore depends on the speed of the vehicle. The extreme values are attained when the vehicle's environmental magnetic field is aligned with the axis of the corresponding coil. The amplitude of the signal is independent of the terrestrial positioning of the vehicle. The phase shift is related to the angle alpha ($\alpha$), corresponding to the angle formed by the two centers of the coils with respect to the rotation axis. By way of example, an offset of 2 cm with respect to a circumference of 100 cm represents an angle of $2/100*360°=7.2°$.

Curves (a) and (b) in FIG. 8 show the signals measured across the terminals of the coils 131 and 132 of a device 70 placed on a tire-wheel assembly under conditions such as represented in FIG. 6. The signal corresponding to the coil 132 lags in phase with respect to that corresponding to the coil 131. The situation would be reversed in the case of the situation presented in FIG. 5, where the signal of the coil 132 would lead in phase with respect to the signal of the coil 131. For a given direction of motion, it is therefore possible to determine the side on which the tire and wheel assembly is situated on the basis of the relative phase shift of the signals measured by the two coils (or, stated otherwise, on the basis of the sign of the phase shift of the signals).

It may be advantageous to transform the measured signals into square signals, with the aid of a simple processing arrangement (e.g., threshold, comparator), as is represented by the two curves (c) in FIG. 8. In this case, it would suffice to detect an edge positioning of each of the two signals.

Figure 9:
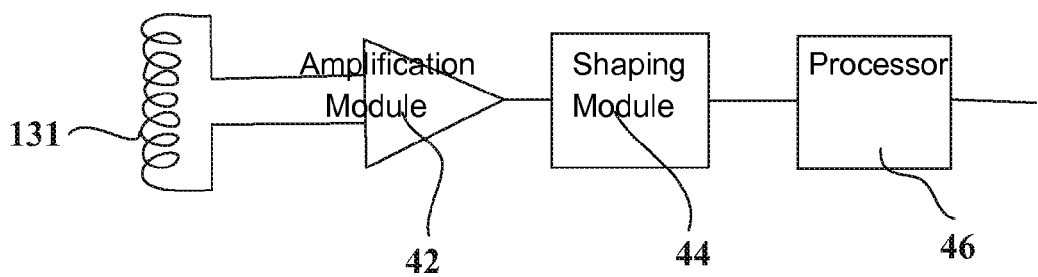
FIG. 9 presents a functional diagram of a device according to an embodiment of the invention.

FIG. 9 presents a functional diagram of the device 70. For measuring and processing the potential difference across the terminals of each coil 131, 132, the device 70 includes an amplification module or circuit 42 and a shaping module or circuit 44, which includes a comparator to give as output from the shaping module or circuit 44 a square signal of the same period as the initial signals. The device 70 additionally includes a calculation unit or processor 46 to which the shaped signal is directed so as to determine, as previously described, the direction of rotation of the wheel by analyzing the sign of the phase shift between the two signals, and to deduce from this direction of rotation and the direction of travel of the vehicle, determined additionally by any method known, the right or left position of the corresponding tire and wheel assembly.

Preferably, the calculation unit or processor 46 of the device 70 according to an embodiment of the invention can also determine the phase of the phase shift between the two signals arising from the two coils by intercorrelating these two signals. The advantage of this procedure is that it is insensitive to the shape of the measured signals and it makes it possible to accumulate information over a sufficiently long period so as to improve the signal-to-noise ratio of the decision criterion and thus lead to an unequivocal response. In this case, the shaping module or circuit 44 of the device 70 is suited to the chosen processing of the data.

The information is transmitted by radio waves to a central unit on board the vehicle.

Of course, an operation principle according to aspects of the present invention cannot be utilized in a reliable manner in a procedure for determining the location of a tire and wheel assembly unless the device 70 is fixed to the same side of the tire and wheel assembly with respect to the vehicle for all the assemblies 91 to 94 whose positioning must be determined. It matters little if this is always the outside or always the inside with respect to the vehicle, provided that it is systematically the same side. Fixing the device 70 on an inflation valve 30 constitutes a particularly simple way to ensure that all the devices 70 are situated on the outside with respect to the vehicle.

It emerges from the descriptions of embodiments of the invention that the direction of motion is a significant parameter for identifying the location of the tire and wheel assemblies; a reversal of the direction gives rise to a reversal of the phase shift of the signals of the two coils 131 and 132. The direction of the motion can be determined with the aid of a known device (such as, for example, a ball device described in European patent document EP 0 760 299), with the aid of existing signals in the vehicle (e.g., signals from energizing of reversing or back-up lights), or else on the basis of the speed of the vehicle (which can be determined on the basis of the frequency of the signals measured by each of the two coils 131 and 132). By deactivating the determination of the location when the speed is less than a certain limit (for example, less than 30 km/h), it is ensured that the vehicle is moving forward when the determination is performed.

The procedure described herein allows only the determination of the side of the vehicle on which a tire and wheel assembly is situated. If the precise position (front or rear of the vehicle) must be determined, the procedure must also be supplemented with any one of the known procedures that make it possible to discriminate between the front and rear positions.

The present invention is not limited to the examples described and represented herein, and various modifications may be made thereto without departing from the scope thereof defined by the appended claims.

The invention claimed is:

1. A location device configured to be carried by a tire and wheel assembly so as to locate a right or left position of the assembly in a vehicle, the device comprising:
   two magnetic sensors with axes of maximum sensitivity;
   a measurement circuit for measuring a signal across terminals of each of the magnetic sensors, the measurement circuit being able to deliver two periodic signals phase-shifted with respect to one another and each periodic signal representative of variations in values of a magnetic field detected by a corresponding magnetic sensor during a revolution of the tire and wheel assembly; and a calculation processor programmed to determine, based on the phase shift between the two periodic signals, a direction of rotation of the tire and wheel assembly, and to deduce, from the direction of rotation and a direction of travel of the vehicle, a right or left location of the tire and wheel assembly, wherein the two magnetic sensors have the axes of maximum sensitivity oriented in parallel, and wherein the two magnetic sensors are configured to be placed on the tire and wheel assembly at respective azimuths, and wherein the two magnetic sensors are configured to be placed on the tire and wheel assembly such that the axes of maximum sensitivity are oriented parallel to a rotation axis of the tire and wheel assembly.

2. A device according to claim 1, wherein the two magnetic sensors are configured to be placed on the tire and wheel assembly at substantially a same distance from a rotation axis of the assembly.

3. A device according to claim 1, wherein the axes of maximum sensitivity of the two magnetic sensors coincide.

4. A device according to claim 1, wherein the two magnetic sensors are configured to be placed on the tire and wheel assembly with the axes of maximum sensitivity oriented circumferentially at a same distance from a rotation axis of the tire and wheel assembly.

5. A device according to claim 1, wherein a circumferential distance between centers of the two magnetic sensors lies between about 1 cm and 8 cm.

6. A device according to claim 1, wherein the calculation processor is programmed to determine a sign of the phase shift between the two periodic signals by intercorrelating the two periodic signals.

7. A device according to claim 1, wherein the device is configured to be fixed to a valve for inflating the tire and wheel assembly.

8. A device according to claim 1, wherein the device is incorporated in a tire to be utilized with the tire and wheel assembly.

9. A device according to claim 1, wherein the device is incorporated in a wheel to be utilized with the tire and wheel assembly.

10. A location device configured to be carried by a tire and wheel assembly so as to locate a right or left position of the assembly in a vehicle, the device comprising:

a plurality of magnetic sensors with axes of maximum sensitivity;

a measurement circuit for measuring a signal across terminals of each of the magnetic sensors, the measurement circuit being able to deliver two periodic signals phase-shifted with respect one another, the two periodic signals being measured from two of the plurality of magnetic sensors, and each periodic signal being representative of variations in values of a magnetic field detected by a corresponding magnetic sensor during a revolution of the tire and wheel assembly; and a calculation processor programmed to determine, based on the phase shift between the two periodic signals, a direction of rotation of the tire and wheel assembly, and to deduce, from the direction of rotation and a direction of travel of the vehicle, a right or left location of the tire and wheel assembly, wherein the two magnetic sensors have the axes of maximum sensitivity oriented in parallel, wherein the two magnetic sensors are configured to be placed on the tire and wheel assembly at respective azimuths, and wherein the two magnetic sensors are configured to be placed on the tire and wheel assembly such that the axes of maximum sensitivity are oriented parallel to a rotation axis of the tire and wheel assembly.

11. A device according to claim 10, wherein the two magnetic sensors are configured to be placed on the tire and wheel assembly at substantially a same distance from a rotation axis of the assembly.

12. A device according to claim 10, wherein the axes of maximum sensitivity of the two magnetic sensors coincide.

13. A device according to claim 10, wherein the two magnetic sensors are configured to be placed on the tire and wheel assembly with the axes of maximum sensitivity oriented circumferentially at a same distance from a rotation axis of the tire and wheel assembly.

14. A device according to claim 10, wherein a circumferential distance between centers of the two magnetic sensors lies between about 1 cm and 8 cm.

15. A device according to claim 10, wherein the calculation processor is programmed to determine a sign of the phase shift between the two periodic signals by intercorrelating the two periodic signals.

16. A device according to claim 10, wherein the device is configured to be fixed to a valve for inflating the tire and wheel assembly.

17. A device according to claim 10, wherein the device is incorporated in a tire to be utilized with the tire and wheel assembly.

18. A device according to claim 10, wherein the device is incorporated in a wheel to be utilized with the tire and wheel assembly.

* * * * *